(12) United States Patent
Okuda et al.

(10) Patent No.: US 11,041,498 B2
(45) Date of Patent: Jun. 22, 2021

(54) FAN MOTOR APPARATUS AND PROTECTION COVER OF FAN MOTOR APPARATUS

(71) Applicant: SANYO DENKI CO., LTD., Tokyo (JP)

(72) Inventors: Yusuke Okuda, Tokyo (JP); Haruhisa Maruyama, Tokyo (JP); Yoshihisa Yamazaki, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 49 days.

(21) Appl. No.: 16/296,341

(22) Filed: Mar. 8, 2019

(65) Prior Publication Data

US 2019/0285076 A1    Sep. 19, 2019

(30) Foreign Application Priority Data

Mar. 13, 2018  (JP) .............................. JP2018-045435

(51) Int. Cl.
| | |
|---|---|
| *F04D 25/08* | (2006.01) |
| *F04D 29/32* | (2006.01) |
| *F04D 25/06* | (2006.01) |
| *H02K 9/06* | (2006.01) |
| *H02K 1/32* | (2006.01) |
| *H02K 7/14* | (2006.01) |

(52) U.S. Cl.
CPC ......... *F04D 25/082* (2013.01); *F04D 25/064* (2013.01); *F04D 29/329* (2013.01); *H02K 1/32* (2013.01); *H02K 9/06* (2013.01); *F05B 2240/30* (2013.01); *F05B 2260/20* (2013.01); *H02K 7/14* (2013.01)

(58) Field of Classification Search
CPC .... F04D 25/082; F04D 25/064; F04D 29/329; H02K 1/32; H02K 9/06; H02K 7/14; F05B 2240/30; F05B 2260/20
See application file for complete search history.

(56) References Cited

U.S. PATENT DOCUMENTS

| | | | |
|---|---|---|---|
| 7,015,606 B2* | 3/2006 | Huang | ..................... H02K 1/32 |
| | | | 310/61 |
| 7,909,586 B2* | 3/2011 | Yu | ....................... F04D 25/0613 |
| | | | 417/354 |
| 8,217,540 B2* | 7/2012 | Best | .................... F04D 25/0613 |
| | | | 310/43 |

(Continued)

FOREIGN PATENT DOCUMENTS

| | | | |
|---|---|---|---|
| DE | 202010013785 U1 | 3/2011 | |
| JP | S552240 A2 | 1/1980 | |

(Continued)

OTHER PUBLICATIONS

Extended European Search Report dated Jul. 15, 2019 for the corresponding European Patent Application No. 19162291.9.

*Primary Examiner* — Woody A Lee, Jr.
*Assistant Examiner* — Eric A Lange
(74) *Attorney, Agent, or Firm* — Rankin, Hill & Clark LLP (57) ABSTRACT

A fan motor apparatus is provided, which includes a blade; a rotary shaft; a hub; a rotor integrally molded with the blade, the rotor being fixed to the rotary shaft; and a protection cover including: a lid portion covering a top surface of the rotor; and an intake port configured to take air into the lid portion.

6 Claims, 7 Drawing Sheets

(56) References Cited

U.S. PATENT DOCUMENTS

| | | | |
|---|---|---|---|
| 2006/0051221 A1 | 3/2006 | Chen | |
| 2009/0010753 A1* | 1/2009 | Xiang | H02K 7/14 415/170.1 |
| 2014/0010645 A1 | 1/2014 | Huang | |
| 2014/0363296 A1* | 12/2014 | Yeh | F04D 19/002 416/144 |

FOREIGN PATENT DOCUMENTS

| | | | |
|---|---|---|---|
| JP | 4542479 B2 | | 9/2010 |
| JP | 2015139225 A | * | 7/2015 |
| JP | 2015139225 A | | 7/2015 |

* cited by examiner

FAN MOTOR APPARATUS AND PROTECTION COVER OF FAN MOTOR APPARATUS

CROSS-REFERENCE TO RELATED APPLICATION

This application claims priority from Japanese Patent Application No. 2018-045435 filed with the Japan Patent Office on Mar. 13, 2018, the entire content of which is hereby incorporated by reference.

BACKGROUND

1. Technical Field

The present disclosure relates to a fan motor apparatus and a protection cover of a fan motor apparatus.

2. Related Art

A resin fan mold included in a fan motor apparatus has a shape that covers a rotor. A top surface of the fan motor apparatus is provided with an air hole for the purpose of encouraging self-cooling of a motor. Furthermore, the top surface of the fan motor apparatus is provided with a weight insertion hole for adjusting balance. Such a fan mold is bonded and fixed to the rotor to assemble blades.

There is a tendency to increase the rotational speed of the blades due to recent years' increase in performance requested for the fan motor apparatus. Furthermore, for example, the high reliability of the fan motor apparatus is also requested. As one of methods for increasing the reliability of the fan motor apparatus, an integral molding technology (insert molding) of a fan mold and a rotor is employed. In this integral molding technology, a fan mold is formed using a rotor set in a mold (Japanese Patent No. 4542479 and JP-A-2015-139225).

SUMMARY

A fan motor apparatus according to an embodiment of the present disclosure includes a blade; a rotary shaft; a hub; a rotor integrally molded with the blade, the rotor being fixed to the rotary shaft; and a protection cover including: a lid portion covering a top surface of the rotor; and an intake port configured to take air into the lid portion.

BRIEF DESCRIPTION OF THE DRAWINGS

FIGS. 2A and 2B are perspective views illustrating a configuration example of a rotor cap of the fan motor apparatus according to the embodiment.

FIGS. 5C and 5D are perspective views illustrating a configuration example of the rotor cap of the fan motor apparatus according to the embodiment.

FIGS. 6A and 6B are diagrams illustrating a configuration example of a fan motor apparatus that includes a rotor to which a hub bonded with blades has been attached, and an air inlet port provided on an inner surface of the rotor, and takes air into the motor from the outside.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6A:
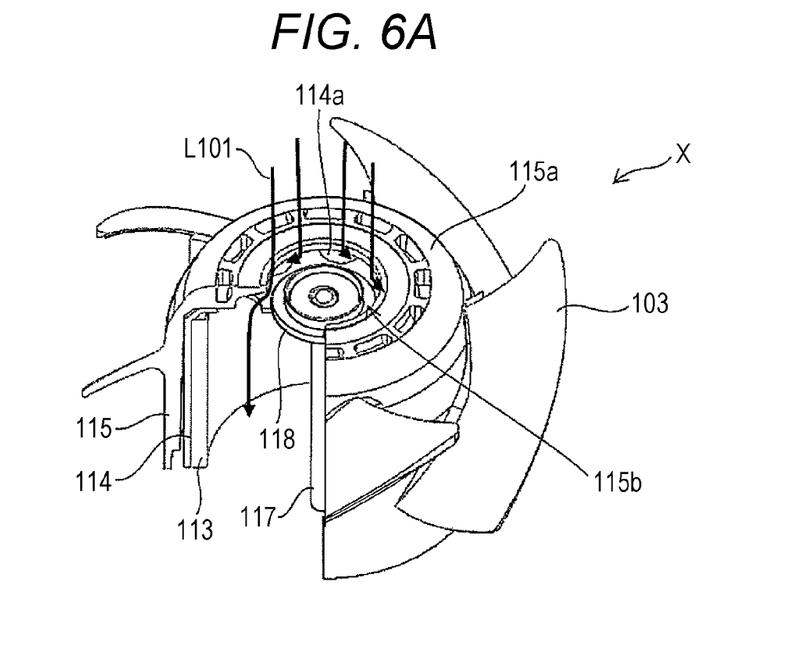
FIG. 6A is a perspective view.

In order to improve the characteristics of a fan motor apparatus, it is necessary to reduce the internal temperature of a motor. For example, a fan motor apparatus X having such a structure as illustrated in FIG. 6A (a perspective view) and FIG. 6B (a cross-sectional side view including a rotary shaft) is known. The fan motor apparatus X includes a rotor 114 fixed to a rotary shaft 117. The rotor 114 has, for example, a substantially L-shape in cross section. Moreover, a hub 115 has been assembled to an outer side of the rotor 114. Blades 103 have been bonded to the hub 115. Furthermore, a magnet 113 is placed on an inner surface of the rotor 114.

Figure 6B:
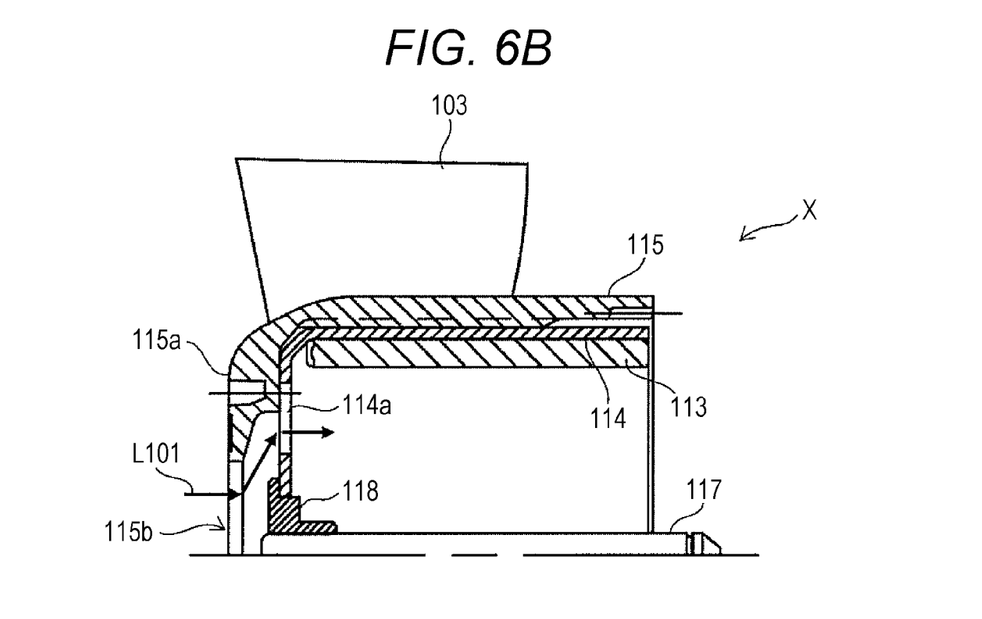
FIG. 6B is a cross-sectional side view.

In the above structure, an air inlet port 114a is provided in such a manner as to take air into an area inside the rotor 114 from an opening 115b of a front surface 115a of the hub 115, avoiding a bushing 118. Consequently, a passage L101 that takes air into the motor from the outside is formed.

However, it is necessary to increase the strength of the blades 103 to address an increase in rotational speed in the fan motor apparatus X with the above structure illustrated in FIGS. 6A and 6B. For example, as illustrated in FIGS. 7A and 7B, an integrally-molded product of the blades 103 and the hub 115, which has been integrally molded with the rotor 114, allows an increase in the strength of the blades 103.

Figure 7A:
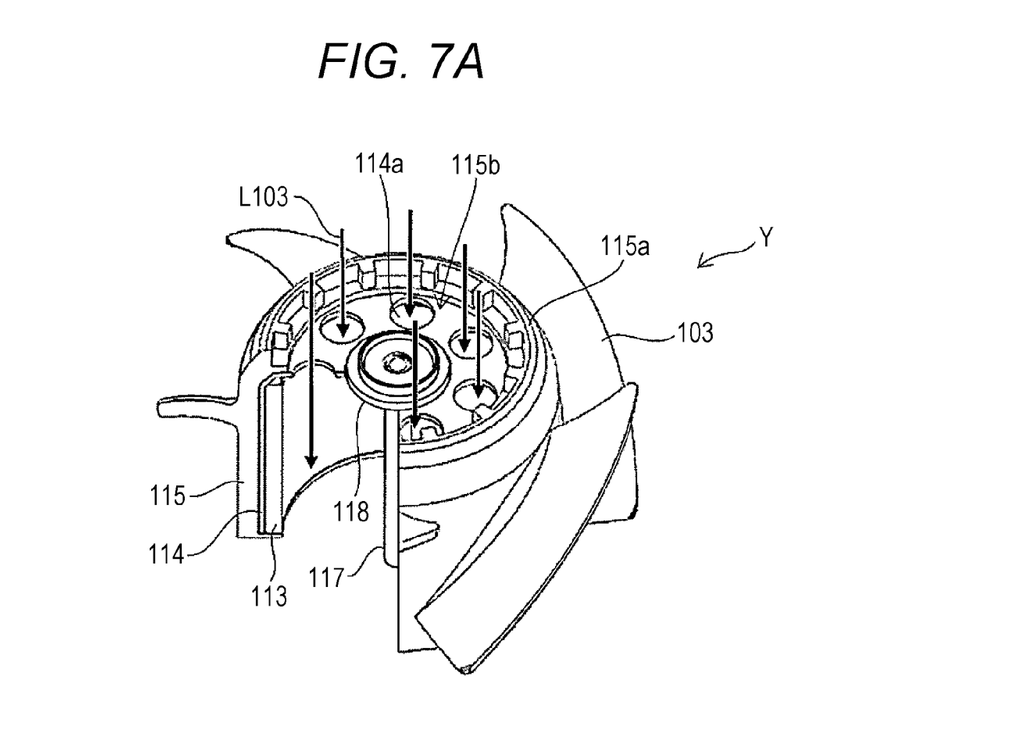
FIG. 7A is a perspective view illustrating a configuration example of the fan motor apparatus of FIG. 6A including an integrally-molded product of the blades and the hub, which has been integrally molded with the rotor.

FIG. 7A is a perspective view corresponding to FIG. 6A. FIG. 7A illustrates a structure including the rotor 114 further integrally molded with the integrally-molded product of the blades 103 and the hub 115. FIG. 7B is a cross-sectional side view corresponding to FIG. 6B. The structure illustrated in FIGS. 7A and 7B can be compatible with an increase in rotational speed as described above.

Figure 7B:
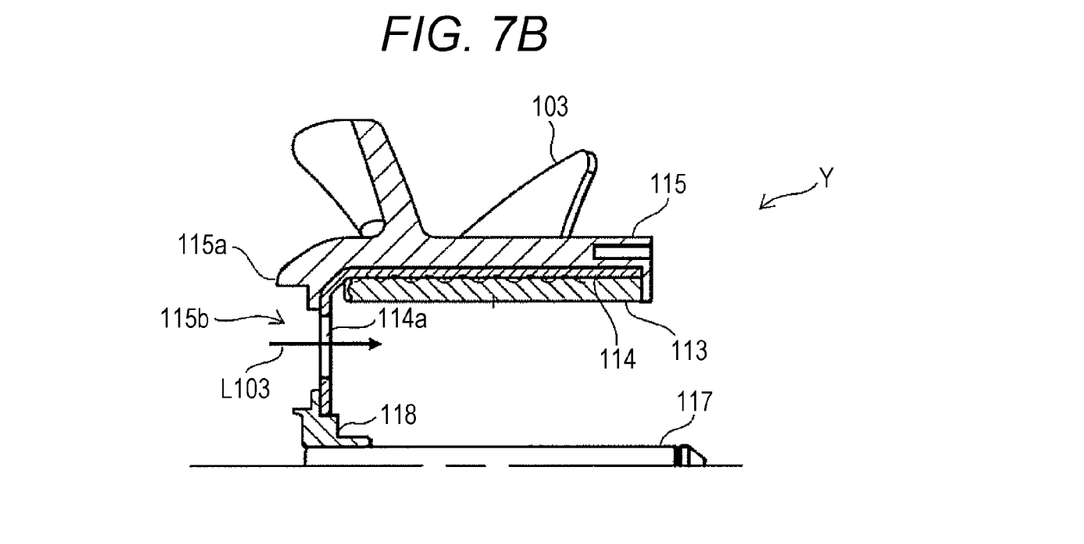
FIG. 7B is a cross-sectional side view illustrating a configuration example of the fan motor apparatus including the blades integrally molded with the rotor.

However, as illustrated in FIGS. 7A and 7B, a fan motor apparatus Y has the structure including the rotor 114 integrated with the integrally-molded product of the blades 103 and the hub 115. Here, the air inlet port 114a of the rotor 114 of the fan motor apparatus Y is exposed to the outside from the opening 115b of the front surface 115a of the hub 115, which facilitates the entrance of air into the motor (a passage L103). However, there arises a new problem such as facilitating also the entrance of foreign matter.

Integral molding of the rotor 114 and the blades 103 by supplying a resin material also to a top surface of the rotor 114 included in the structure illustrated in FIGS. 7A and 7B is also under study. According to this method, the entrance of foreign matter from the air inlet port 114a on the top surface side can be prevented. However, this method results in blocking the passage of air into the motor. Hence, there arises a problem in that it becomes difficult to prevent heat from being generated in the motor.

In the embodiments, an object is to achieve compatibility between the prevention of the entrance of foreign matter into a fan motor apparatus and an improvement in internal cooling efficiency.

One aspect of the present embodiment provides a fan motor apparatus including: a blade; a rotary shaft; a hub; a rotor integrally molded with the blade, the rotor being fixed to the rotary shaft; and a protection cover including: a lid portion covering a top surface of the rotor; and an intake port configured to take air into the lid portion. Consequently, it is possible to prevent the entrance of foreign matter while ensuring an air passage into the rotor.

The top surface may include an air hole, and the lid portion may be placed at a position that blocks the air hole. The lid portion may include a fixing hole portion configured to fix the protection cover to the rotary shaft, and the intake port may have been formed radially from the fixing hole portion toward an outer peripheral direction of the lid portion.

The fan motor apparatus may further include a balance adjustment hole provided on a front surface on an intake side of the hub, the balance adjustment hole being configured to adjust balance for rotation of the blade. An outer peripheral portion of the protection cover may also serve as an inner wall of the balance adjustment hole. The intake port may be placed along an inner periphery of a front surface of the hub on the top surface of the protection cover. A plate-shaped portion of the top surface of the protection cover may be inclined downward below the intake port.

In addition, a protection cover of a fan motor apparatus according to the present embodiment is configured to be attached to a fan motor apparatus including a blade integrally molded with a rotor fixed to a rotary shaft, the fan motor apparatus protection cover comprising a top surface, wherein the top surface includes: a lid portion configured to cover a top surface of the rotor; and an intake port.

According to the embodiments, it is possible to achieve compatibility between the prevention of the entrance of foreign matter into a fan motor apparatus and an improvement in internal cooling efficiency.

A member designated as a "protection cover" in the specification is also designated as a "cover" or a "protection cap." These members described below are not limited by the designations to specific members.

A fan motor apparatus according to one embodiment of the present disclosure is described in detail hereinafter with reference to the drawings.

First Embodiment

Figure 1A:
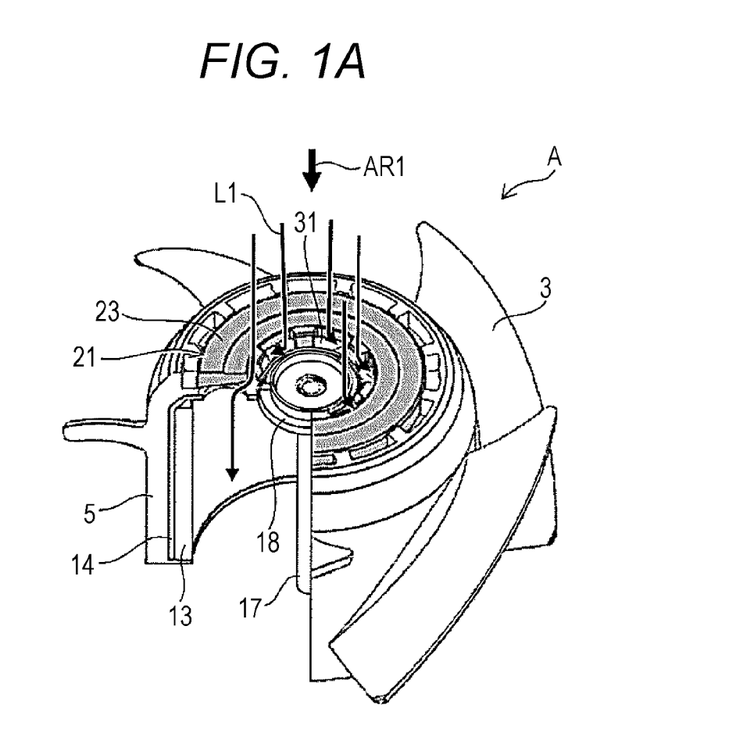
FIG. 1A is a perspective view illustrating a configuration example of a fan motor apparatus according to a first embodiment of the present disclosure.
Figure 1B:
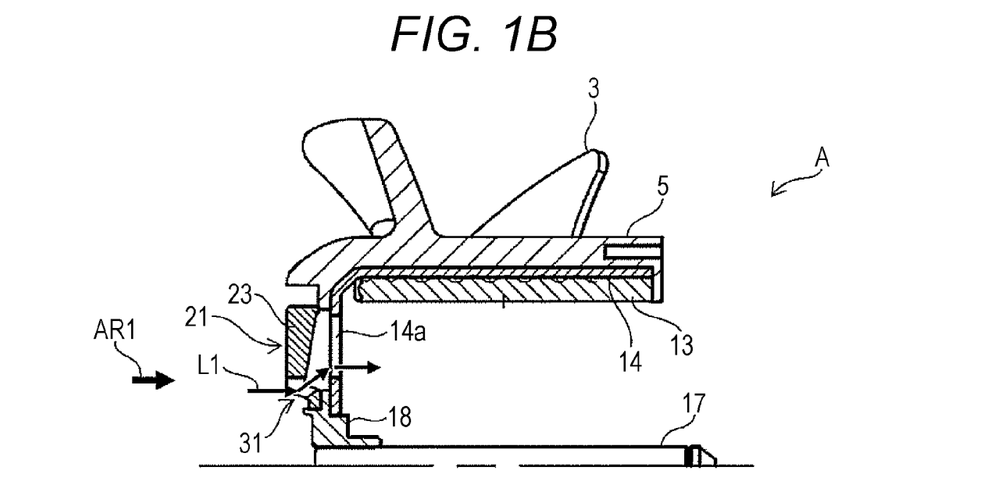
FIG. 1B is a cross-sectional side view thereof.
Figure 2A:
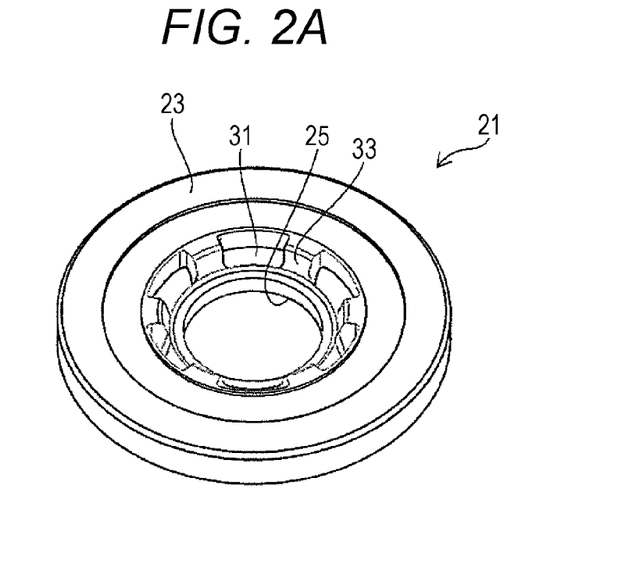
FIG. 2A is a perspective view as viewed from a front surface side.
Figure 2B:
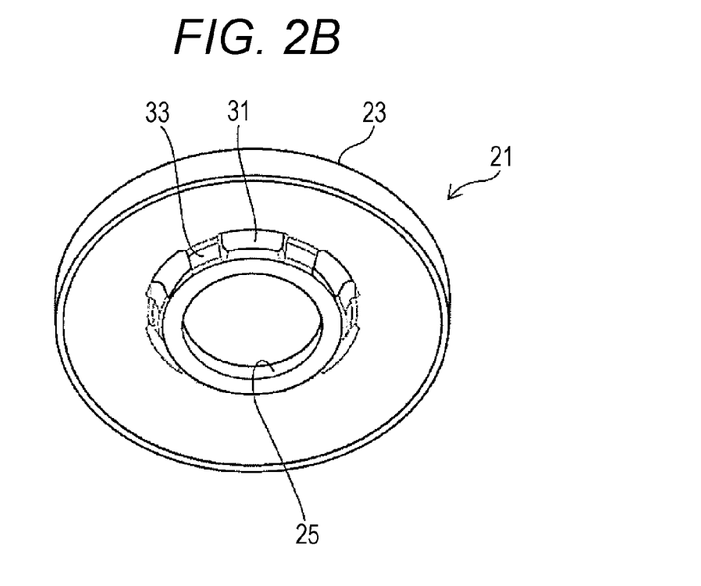
FIG. 2B is a perspective view as viewed from a rear surface side.

FIG. 1A is a perspective view illustrating a configuration example of a fan motor apparatus according to a first embodiment of the present disclosure. FIG. 1B is a cross-sectional side view illustrating a configuration example of the fan motor apparatus according to the embodiment, the cross-sectional side view including a rotary shaft of the fan motor apparatus. The left side in FIG. 1B corresponds to, for example, an intake side AR1. FIGS. 2A and 2B are perspective views illustrating a configuration example of a protection cover (rotor cap) used for the fan motor apparatus according to the embodiment. FIG. 2A is a perspective view as viewed from a front surface side. FIG. 2B is a perspective view as viewed from a rear surface side.

A fan motor apparatus A according to the embodiment includes a hub 5 to which blades (blades) 3 have been attached, a rotor 14 that has been formed on an inner surface of the hub 5, and a magnet 13 formed as an integral product on an inner surface of the rotor 14. The rotor 14 has been integrally formed with a rotary shaft 17. Moreover, the rotor 14 has a substantially L-shape in cross-section and has a cup shape as viewed from a distal end direction of the rotary shaft 17. Furthermore, the rotor 14 is connected to the rotary shaft 17 via a rotor bushing 18. In FIGS. 1A and 1B, illustration of a stator is omitted.

A protection cover 21 that covers an exposed surface of a top surface being an intake-side end surface of the rotor 14 has been attached to the top surface. As illustrated in FIG. 2A, the protection cover 21 includes a lid-like member (lid portion) 23 of, for example, a disc shape. A fixing hole portion 25 for fixing the protection cover 21 to the rotary shaft 17 has been formed in, for example, a center portion of the lid portion 23. Furthermore, the lid portion 23 includes, for example, a single or a plurality of hole portions (intake ports) 31 formed radially from the fixing hole portion 25 toward the lid portion 23. The intake port 31 is divided into a plurality of sections by a plurality of support portions 33 extending from the fixing hole portion 25 toward an outer peripheral direction of the lid portion 23.

The support portion 33 is inclined in the radial direction from the fixing hole portion 25 toward the outer peripheral direction of the lid portion 23. The support portions 33 may be placed parallel in a circumferential direction.

As illustrated in FIG. 1B, an air hole 14a on the exposed surface has been formed on the top surface being the intake-side end surface of the rotor 14. The protection cover 21 has a shape that the lid portion 23 covers the air hole 14a on the exposed surface of the rotor 14 from a front surface side.

The protection cover 21 hides the air hole 14a on the top surface of the rotor 14 with the lid portion 23 to prevent the entrance of foreign matter. Moreover, the intake port 31 is provided in a center portion of the protection cover 21. Thought was given to the cap shape so that it allows the formation of an air passage between the intake port 31 and the air hole 14a on the top surface of the rotor 14. Consequently, the inside of the fan motor apparatus A can be cooled. The plurality of intake ports 31 provided on the protection cover 21 ensures an air passage L1. The air passage L1 allows air to be easily taken into the rotor 14.

The protection cover 21 is detachable from the rotor 14, for example, during the manufacturing process. However, the protection cover 21 is fixed to the rotor 14 in a final product.

In this manner, in the embodiment, in addition to the hub that has been integrally molded with the rotor 14 including the exposed top surface, the protection cover 21 that covers the top surface of the rotor 14 is newly provided.

As described above, the disc-shaped protection cover 21 including the air inlet port is attached to the rotor 14 integrally molded with the blades 3, which makes it possible to prevent the entrance of foreign matter while ensuring the air passage.

Figure 3:
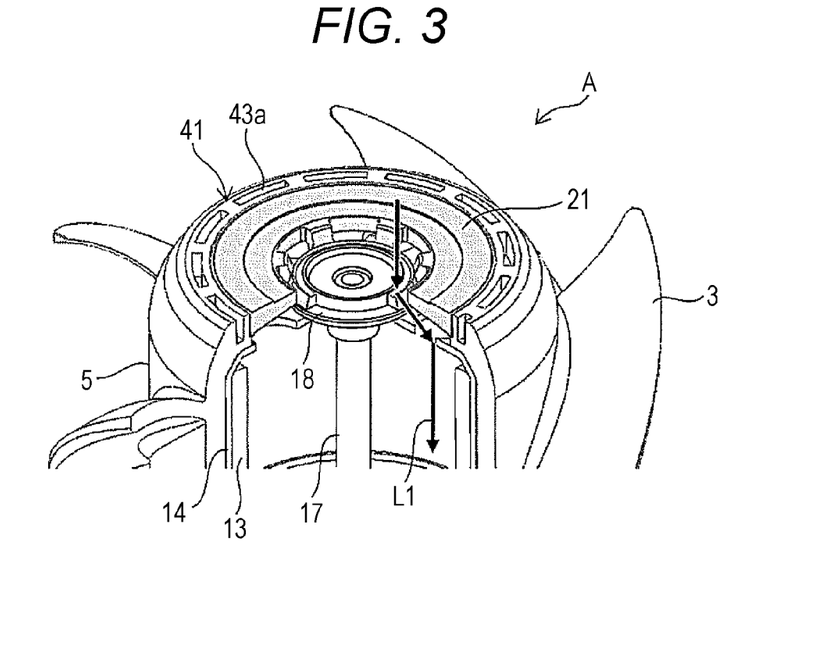
FIG. 3 is a perspective view illustrating a configuration example of the fan motor apparatus according to the embodiment, and illustrates an example of including a small balance adjustment hole.
Figure 4:
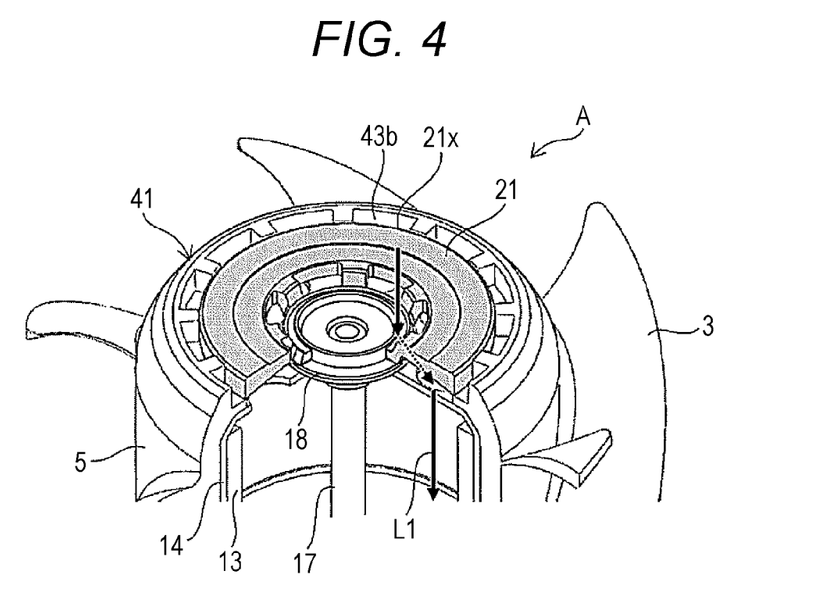
FIG. 4 is a perspective view illustrating a configuration example of the fan motor apparatus according to the embodiment including the balance adjustment hole larger than the configuration of FIG. 3.

FIGS. 3 and 4 are perspective views illustrating a configuration example of the fan motor apparatus according to the embodiment. FIGS. 3 and 4 are diagrams explaining a balance adjustment hole 43 provided on a front surface 41 on the intake side of the hub 5 to adjust balance for rotation of the blades.

As illustrated in FIG. 3, if an attempt is made to form the balance adjustment hole 43 within an area of the front surface 41 of the hub 5, the size of the balance adjustment hole 43 is reduced (a reference numeral 43a) due to a limited space of the area of the front surface 41 of the hub 5. Hence, it is difficult to sufficiently ensure the volume of the balance adjustment hole 43. Hence, as illustrated in FIG. 4, the disc-shaped protection cover 21 including the air inlet port has been attached to the rotor 14 integrally molded with the blades 3. In this structure, an outer peripheral portion 21x of the disc-shaped protection cover 21 also serves as an inner wall forming a balance adjustment hole 43b on the front surface 41 of the hub 5.

In the structure illustrated in FIG. 4, the outer peripheral portion 21x of the protection cover 21 serves as an inner boundary for delimiting the size of the balance adjustment hole 43b. In other words, the outer peripheral portion 21x of the protection cover 21 also serves as the inner wall of the balance adjustment hole 43b. This makes it possible to increase the size (the width in the radial direction) of the balance adjustment-purpose hole. Therefore, it becomes possible to reduce vibration in the fan motor apparatus.

The protection cover according to the embodiment includes the air vent placed around the bushing. In other words, the structure that focuses on the prevention of the entrance of foreign matter is realized.

Second Embodiment

Figure 5A:
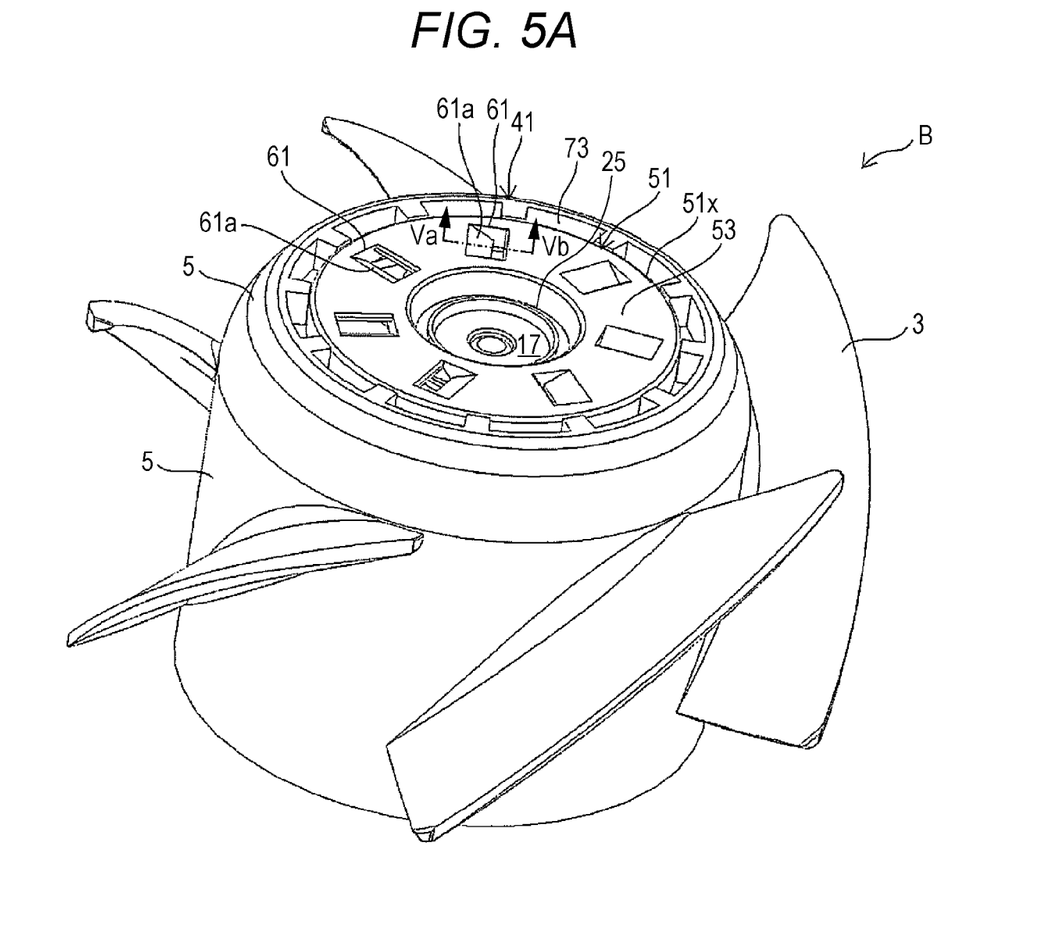
FIG. 5A is a perspective view illustrating a configuration example of a fan motor apparatus according to a second embodiment of the present disclosure.
Figure 5B:
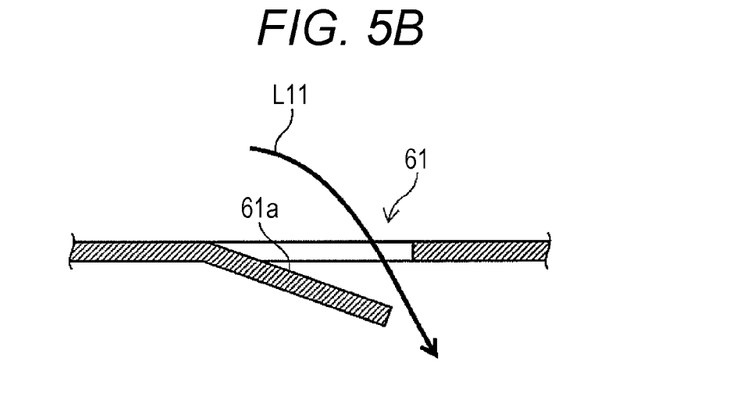
FIG. 5B is a cross-sectional side view of an air vent of a rotor cap.
Figure 5C:
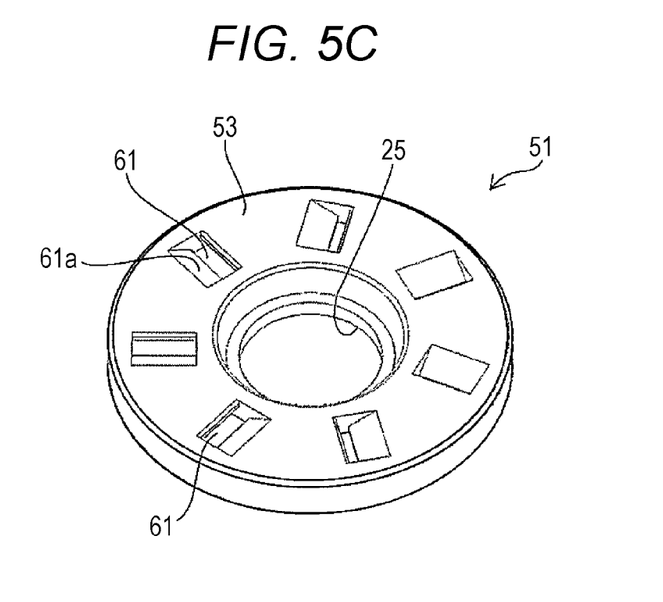
FIG. 5C is a perspective view as viewed from a front surface side.
Figure 5D:
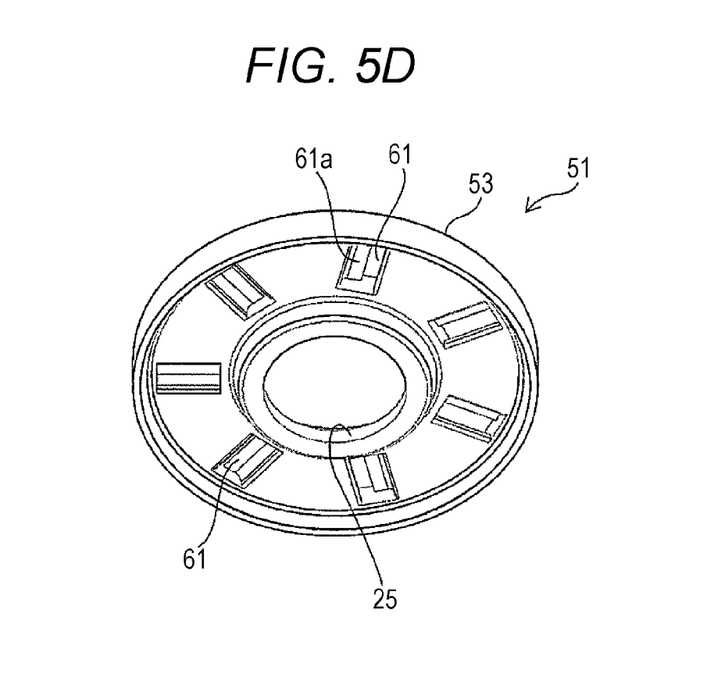
FIG. 5D is a perspective view as viewed from a rear surface side.

FIG. 5A is a perspective view illustrating a configuration example of a fan motor apparatus according to a second embodiment of the present disclosure. FIG. 5B is a perspective view illustrating a configuration example of a protection cover (rotor cap) used for the fan motor apparatus according to the embodiment. FIG. 5C is a perspective view as viewed from a front surface side. FIG. 5D is a perspective view as viewed from a rear surface side. In a fan motor apparatus B according to the embodiment illustrated in FIG. 5A, the structure of the protection cover is different from that of the first embodiment. The structure of the protection cover of the embodiment is described below.

As illustrated in FIG. 5A and FIGS. 5C and 5D, a plurality of hole portions (intake ports) 61 has been formed along an inner periphery of a front surface 41 of a hub 5 on a top surface 53 of a protection cover 51 according to the embodiment. As illustrated in FIGS. 5B, 5C, and 5D, for example, a plate-shaped portion 61a of the top surface 53 is inclined downward below the intake port 61. Moreover, as in the first embodiment, in the illustrated structure, an outer portion 51x of a lid portion 23 of the disc-shaped protection cover 51 also serves as part, here an inner side surface, of a balance adjustment-purpose hole 73. Accordingly, the size of the balance adjustment-purpose hole can be increased. Hence, it becomes possible to reduce vibration and increase productivity.

The protection cover according to the embodiment has the structure of including the intake port radially placed on the top surface. Hence, a larger amount of ventilation can be obtained. Hence, the protection cover according to the embodiment is more suitable to improve internal cooling efficiency of the fan motor apparatus.

The above embodiments are not limited to the configurations and the like illustrated in the accompanying drawings. The embodiments can be modified as appropriate within the scope that does not hinder the exertion of the effects of the embodiments. In addition, an appropriately modified embodiment can be carried out without departing from the scope of the object of the embodiments.

For example, the shape of the protection cover is not limited to the disc shape. Moreover, the shape and the placement of the intake port can be designed as appropriate.

Moreover, the components of the present disclosure can be selected as appropriate. An embodiment including the selected configuration is also included in the embodiments.

The present disclosure can be used for a fixing structure of a fan motor apparatus.

The fan motor apparatus according to the embodiments of the present disclosure may be the following first to sixth fan motor apparatuses:

The first fan motor apparatus is a fan motor apparatus having a rotor integrally molded with a blade, the rotor being fixed to a rotary shaft, the fan motor apparatus including a protection cover having: a lid portion covering an exposed surface of a top surface being an intake port-side end surface of the rotor; and an intake port for taking air into the lid portion.

The second fan motor apparatus is the first fan motor apparatus characterized in that the lid portion is placed at a position that blocks an air hole on the top surface of the rotor.

The third fan motor apparatus is the first or second fan motor apparatus wherein the lid portion has a fixing hole portion for fixing the protection cover to the rotary shaft, and the intake port has been formed radially outward from the fixing hole portion toward the lid portion.

The fourth fan motor apparatus is any of the first to third fan motor apparatuses including a balance adjustment hole for adjusting balance for rotation of the blade, the balance adjustment hole being provided on a front surface on an intake side of the rotor, wherein an outer peripheral portion of the protection cover also serves as an inner wall of the balance adjustment hole.

The fifth fan motor apparatus is the first or second fan motor apparatus wherein the intake port has been formed along an inner periphery of a front surface of the hub on the top surface of the protection cover.

The sixth fan motor apparatus is the fifth fan motor apparatus wherein the intake port has a shape where a plate-shaped portion of the top surface is inclined downward.

A protection cover according to the embodiments of the present disclosure is a protection cover of a fan motor apparatus having a blade integrally molded with a rotor fixed to a rotary shaft, and may include: a lid portion covering an exposed surface of a top surface being an intake port-side end surface of the rotor; and an intake port on the lid portion.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A fan motor apparatus comprising:
a blade;
a rotary shaft;
a hub;
a rotor integrally molded with the blade, the rotor being fixed to the rotary shaft; and
a protection cover including:
a lid portion covering a top surface of the rotor; and
an intake port configured to take air into the lid portion,
wherein the blade is attached to an outer surface of the hub, the outer surface of the hub being in parallel to a rotation axis of the rotary shaft;
an air hole on the top surface of the rotor is, in a radial direction of the rotary shaft, closer to the rotary shaft than the blade is;
a distance from the rotary shaft to the intake port in the radial direction of the rotary shaft is equal to or smaller than a distance from the rotary shaft to the air hole in the radial direction of the rotary shaft;
the fan motor apparatus further comprises a balance adjustment hole provided on a front surface on an intake side of the hub, the balance adjustment hole being configured to adjust balance for rotation of the blade;
an outer peripheral portion of the protection cover also serves as an inner wall of the balance adjustment hole; and
the inner wall of the balance adjustment hole consists of the outer peripheral portion of the protection cover.

2. The fan motor apparatus according to claim 1, wherein the lid portion is placed at a position that blocks the air hole.

3. The fan motor apparatus according to claim 1, wherein the lid portion includes a fixing hole portion configured to fix the protection cover to the rotary shaft, and the intake port has been formed radially from the fixing hole portion toward an outer peripheral direction of the lid portion.

4. The fan motor apparatus according to claim 1, wherein the intake port is placed along an inner periphery of the front surface of the hub on the top surface of the protection cover.

5. The fan motor apparatus according to claim 4, wherein a plate-shaped portion of the top surface of the protection cover is inclined downward below the intake port.

6. A protection cover of a fan motor apparatus configured to be attached to a fan motor apparatus including a hub, a blade integrally molded with a rotor fixed to a rotary shaft, the protection cover comprising a top surface, wherein the top surface includes:
a lid portion configured to cover a top surface of the rotor; and
an intake port configured to take air into the lid portion;
the blade is attached to an outer surface of the hub, the outer surface of the hub being in parallel to a rotation axis of the rotary shaft;
an air hole on the top surface of the rotor is, in a radial direction of the rotary shaft, closer to the rotary shaft than the blade is;
a distance from the rotary shaft to the intake port in the radial direction of the rotary shaft is equal to or smaller than a distance from the rotary shaft to the air hole in the radial direction of the rotary shaft;
the fan motor apparatus further includes a balance adjustment hole provided on a front surface on an intake side of the hub, the balance adjustment hole being configured to adjust balance for rotation of the blade;
an outer peripheral portion of the protection cover also serves as an inner wall of the balance adjustment hole; and
the inner wall of the balance adjustment hole consists of the outer peripheral portion of the protection cover.

* * * * *